United States Patent [19]
Brissaud et al.

[11] 3,920,518
[45] Nov. 18, 1975

[54] PRESSURE VESSELS HAVING THERMAL INSULSATION

[75] Inventors: Jean Brissaud, Paris, France; William Birch, Knutsford, England

[73] Assignees: Technigaz, Paris, France; The Nuclear Power Group Limited, England

[22] Filed: Oct. 26, 1972

[21] Appl. No.: 301,255

[30] Foreign Application Priority Data
Oct. 26, 1971  United Kingdom............... 49771/71

[52] U.S. Cl. ......................... 176/87; 52/408; 220/9
[51] Int. Cl. ............................................. G21c 11/00
[58] Field of Search .......... 176/87; 106/40; 52/408, 52/409; 220/3.1, 9, 9 D, DIG. 9

[56] References Cited
UNITED STATES PATENTS

| | | | |
|---|---|---|---|
| 2,175,948 | 10/1939 | Adams | 220/DIG. 9 |
| 3,330,675 | 7/1967 | Magder | 106/40 R |
| 3,403,807 | 10/1968 | Hawgood et al. | 176/87 X |
| 3,595,728 | 7/1971 | Robson | 176/87 X |

FOREIGN PATENTS OR APPLICATIONS

| | | |
|---|---|---|
| 1,187,304 | 4/1970 | United Kingdom |
| 1,147,950 | 4/1969 | United Kingdom |

*Primary Examiner*—Harvey E. Behrend
*Attorney, Agent, or Firm*—Holman & Stern

[57] ABSTRACT

A thermal barrier system for use in a pressure vessel, such as a pre-stressed concrete pressure vessel housing the pressurized primary circuit of a gas-cooled nuclear reactor, in which there is provided a metal liner, stud members fixed to the metal liner, an inner flexible membrane fixed to the stud member, and porous insulation held between the liner and the membrane.

3 Claims, 7 Drawing Figures

PRESSURE VESSELS HAVING THERMAL INSULSATION

BACKGROUND OF THE INVENTION

This invention relates to thermal barrier systems which are particularly, although not exclusively, applicable to high temperature gas cooled reactors.

The use of pre-stressed concrete pressure vessels to house the pressurized primary circuit of gas cooled reactor systems has entailed the development of high grade thermal insulation capable of functioning in high pressure gas environments. While the change from steel to pre-stressed concrete vessels has allowed the design of a more economic nuclear power plant in terms of size and working pressure, nevertheless, a new design constraint, namely the sensitivity of the concrete to high temperature, has to be resolved. Temperature limitations in terms of both absolute temperature and an allowable gradient through the vessel walls require a protective thermal barrier located on the inner vessel wall to separate the reactor coolant from the vessel concrete. The insulation used in a gas cooled nuclear reactor must also be designed to withstand or be isolated from the intense noise environment arising from the gas circulators.

OBJECT AND SUMMARY OF THE INVENTION

An object of this invention is to provide a thermal barrier system comprising an insulant contained and supported by a metallic hot face structure. The hot face structure is required to accommodate both considerable relative thermal expansion and other service loading, simultaneously guaranteeing system integrity and durability.

The present invention consists in a thermal barrier system for use in a pressure vessel, wherein porous insulation is held between a metal liner and an inner flexible membrane by means of stud members fixed to the metal liner and the flexible membrane.

The flexible membrane is preferably formed with flexible corrugations and corrugated junctions to define areas of polygonal array.

The membrane may be formed from a plurality of metal plate members joined near their margins by flexible metal membrane portions.

The membrane may be formed of relatively thin metal section reinforced within polygonal areas defined by the corrugated sections by relatively thick section metal plates on the inner or outer face of the membrane wall.

Preferably filter vents are incorporated to provide means for balancing the pressure within the layer of insulant and to provide controlled maximum pressure differential porting. The attachment studs may incorporate the filter vents.

The attachment studs are preferably tubular and the metal retaining plates and or flexible membrane may be secured to the studs by an explosive welding technique.

Further features of the invention will become apparent from the following description of a preferred embodiment, described by way of example only with reference to the accompanying drawings in which:

DETAILED DESCRIPTION OF THE INVENTION

Figure 1:
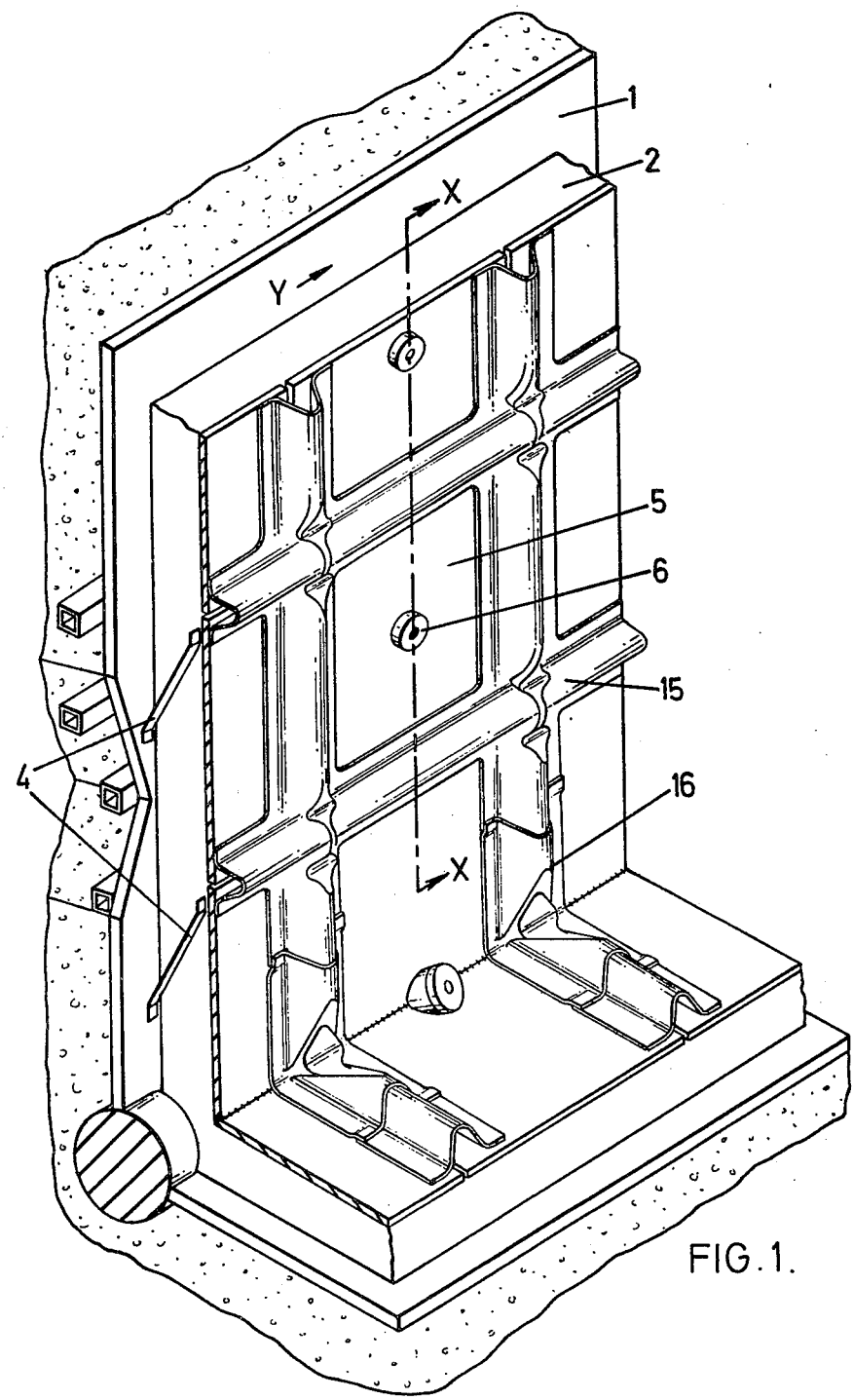
FIG. 1 is an elevation of part of a flexible membrane structure in accordance with the invention and applicable to a nuclear reactor pressure vessel.
Figure 2:
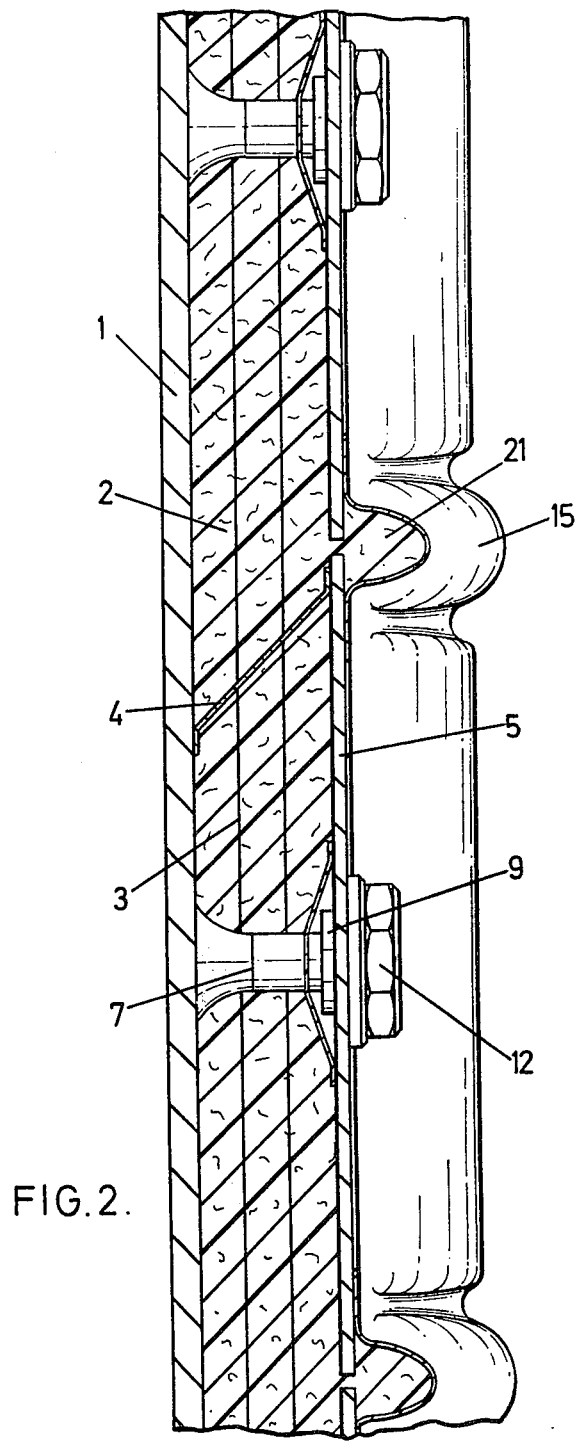
FIG. 2 is a part sectional elevation on line X—X in the direction of arrow Y on FIG. 1.

As shown in FIGS. 1–2, the thermal barrier is assembled on a water cooled mild steel liner 1 which defines the internal envelope of a concrete pressure vessel, and comprises layers of ceramoc wool or similar porous insulant 2, separated by various supporting foils and mesh sheets 3 and supplemented by metal shelves 4 on vertical surfaces. The insulant 2 is compressed to the liner 1 by a number of rigid compression plates 5 which are held in contact with the insulant by tubular studs 6 welded to the liner. The stud incorporates a friction welded bimetallic joint 7 providing a mild steel portion for liner attachment with the other portion formed in austenitic stainless steel for operation at hot face temperature.

Figure 5:
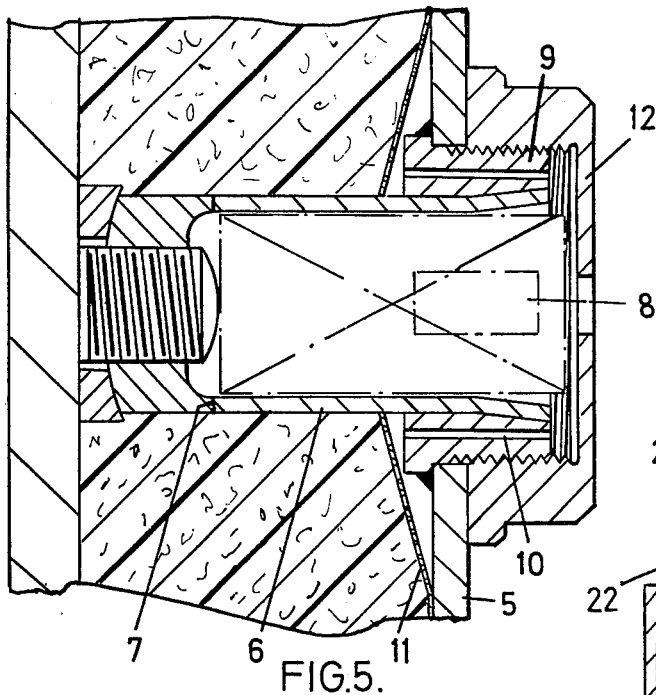
FIG. 5 shows a detail of the fixing stud arrangement applied to the invention.

A method of fixing the compression plate 5 to the stud is disclosed in greater detail on FIG. 5 which shows a method of explosively forming a weld which consists of detonating a small charge 8 within a plain bore of the tubular stud. This causes the mouth of the bore to flare outwards and be impact welded to a conical area of an impact collar 9 located and welded into the compression plate 5. This attachment method allows very precise location of the plates by accommodating adverse positional tolerances, both axial and angular displacement, applicable to the plate 5 stud 6 and liner 2 combination.

Figure 6:
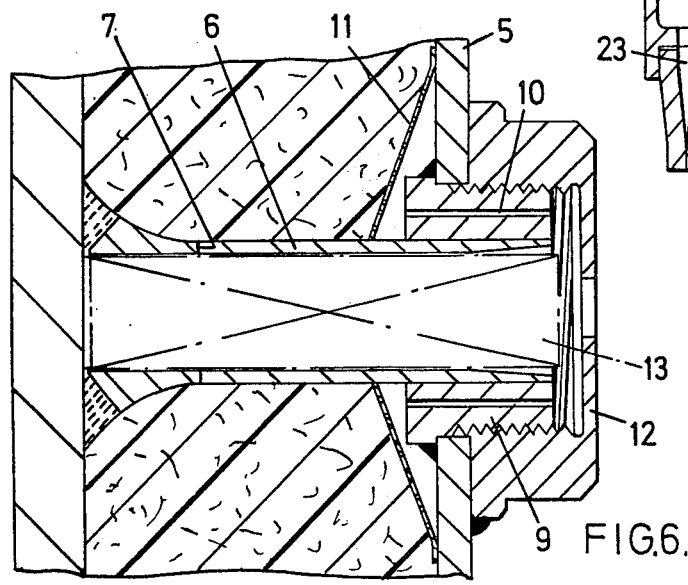
FIG. 6 shows an alternative form of fixing stud.

The impact collar incorporates gas balancing holes 10 terminating at the underside of a filter disc 11, and the latter is designed to prevent egress of the ceramic wool type insulant. As shown in FIG. 6, the inner bore of stud 6 is filled with an insulant 13 and capped by a screwed retaining disc 12 and so provides a tortuous extension of the gas balancing vents 10 to provide maximum attenuation of the high sound pressure levels which may prevail in the gas circuit of a nuclear reactor and thus avoid acoustic damage to or stratification of the insulation material.

Returning now to FIGS. 1, 2 and 3, Flexible membrane portions 14 or 15 are welded to the rigid compression plates 5 or to a pierced compression plate 17 respectively, to form a composition and continuous metallic membrane. The flexible membrane portions may be either of the 3 or 4 way configuration. The voids within the corrugations are filled with molded ceramic fiber 21 on assembly, thus preventing migration of the main insulant layer 2. The corrugation system includes complementary junction elements to accommodate major changes of the plane of the liner to be insulated. A typical 90° angle piece is shown at 16 on FIG. 1. Further details of the manner of forming the corrugated sections are disclosed in British Pat. Nos. 1,147,950 and 1,187,304.

Figure 3:
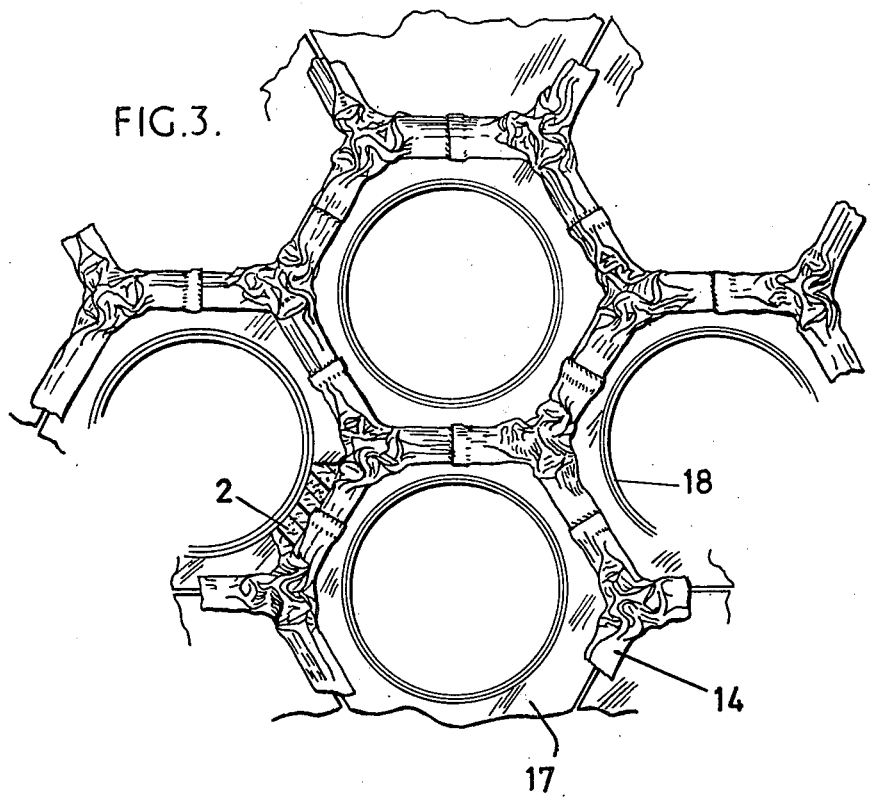
FIG. 3 is a plan view of an alternative form of flexible membrane to that shown in FIGS. 1 and 2.
Figure 4:
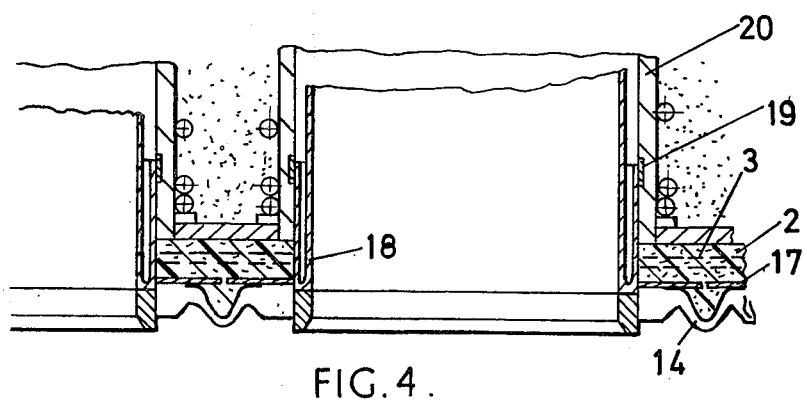
FIG. 4 is a sectional view showing further constructional details of the embodiment shown in FIG. 3.

The hot face structure may be applied to flat, single, and double curvature surfaces and accept both large and small diameter penetrations. Typical integration of a small bore penetration within the concrete structure is shown in FIGS. 3 and 4 in which the mounting of the pierced compression plate 17 is effected by a thermal sleeve 18 welded to a mounting garter strip 19 slotted into a vessel penetration shutter tube 20.

Figure 7:
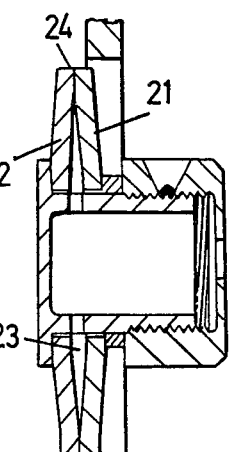
FIG. 7 shows an alternative form of a sintered metal filter in accordance with the invention.

FIG. 7 shows an alternative form of sintered metal filter which consists of two sintered metal discs 21, 22 having a through bore open portion 23 and sealed at outer periphery 24.

The invention is not limited to the form of the embodiments described, for example, the flexible membrane may comprise a single thin sheet member including corrugations and the rigid compression plates may superpose or be superimposed by the membrane. Alternative means of attaching the studs and hot face retaining wall may be used, and furthermore, the insulation may be of alternative material and may be formed in layers as described in British Pat. No. 1,194,333.

The corrugated structure described forms a continuous metallic hot face which absorbs in-plane differential thermal movement by bending flexure of the corrugations as opposed to sliding seal features incorporated on previous reactors using similar barrier designs with porous insulants. The invention has the advantage of avoiding such sliding components and offers increased integrity in terms of insulant protection and egression control particularly since all venting takes place through zero loss filters. It also reduces the number of and simplifies the hot face components and when assembled using the explosive welding technique described considerably improves the erection procedure.

It will be appreciated that this invention is applicable to other pressure vessel arrangements and is not limited to application to nuclear reactors.

We claim:

1. A nuclear reactor pressure vessel having an inner wall and a thermal barrier system on the inner wall, the thermal barrier system including a metal liner coextensive with and applied to the inner wall of the vessel, an impervious metal membrane spaced from said liner in substantially parallel relationship thereto, heat-resistant insulation contained in the space between the liner and the membrane, tubular studs secured to the membrane and liner whereby the membrane compresses the heat-resistant insulation to the liner, said membrane having flexible corrugated portions, said flexible corrugated portions being of lesser cross section than the cross section of the major portion of said membrane, each of said studs comprising a hollow body having an inner end and a mouth located exteriorly of the membrane, an impact collar surrounding said hollow body, said collar being of such length as to extend into the space between the liner and membrane and terminate adjacent the mouth of the hollow body, said collar having passages extending axially therethrough to provide fluid communication between the insulation and the interior of the hollow body, means within the space adjacent the inner end of the collar for preventing egress of the insulation, and a cap attached to the collar whereby there is provided a tortuous extension of said passages for providing maximum attenuation of high-sound pressure levels prevailing within the reactor and avoiding acoustic damage to the insulation.

2. The nuclear reactor pressure vessel as claimed in claim 1 in which said means preventing egress of the insulation includes a filter disc encircling the hollow body and being in engagement with the hollow body.

3. The nuclear reactor pressure vessel as claimed in claim 1 in which said hollow body is filled with insulating material.

* * * * *